US011200533B2

(12) United States Patent
Kim et al.

(10) Patent No.: US 11,200,533 B2
(45) Date of Patent: *Dec. 14, 2021

(54) COMPUTER-IMPLEMENTED SYSTEMS AND METHODS FOR VALIDATING A QUANTITY OF ITEMS IN FULFILLMENT CENTERS FOR INVENTORY MANAGEMENT

(71) Applicant: COUPANG CORP., Seoul (KR)

(72) Inventors: So Hee Kim, Seoul (KR); SeHwan Chung, Seoul (KR); SangMin Jun, Seoul (KR); Daeyong Jang, Seoul (KR); Da Young Kim, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,797

(22) Filed: Jun. 26, 2020

(65) Prior Publication Data

US 2021/0012273 A1 Jan. 14, 2021

Related U.S. Application Data

(63) Continuation of application No. 16/505,889, filed on Jul. 9, 2019, now Pat. No. 10,755,231.

(51) Int. Cl.
*G06Q 10/08* (2012.01)
(52) U.S. Cl.
CPC .................................. *G06Q 10/087* (2013.01)
(58) Field of Classification Search
CPC .................................................... G06Q 10/087
See application file for complete search history.

(56) References Cited

U.S. PATENT DOCUMENTS

| 8,346,630 | B1 | 1/2013 | McKeown |
| 8,606,658 | B2 | 12/2013 | Borom |

(Continued)

FOREIGN PATENT DOCUMENTS

| JP | H8-091510 A | 10/1997 |
| JP | H11-296606 A | 10/1999 |

(Continued)

OTHER PUBLICATIONS

Examination Report No. 1 for counterpart Australian Patent Application No. 2020264402, dated Dec. 8, 2020, (4 pages).

(Continued)

*Primary Examiner* — Sonji N Johnson
(74) *Attorney, Agent, or Firm* — Finnegan, Henderson, Farabow, Garrett & Dunner, LLP

(57) ABSTRACT

Disclosed embodiments provide systems and methods related to managing inventory by validating physical quantities of items in fulfillment centers for use with a user interface. A method for managing inventory comprises receiving, from a mobile device, a request for one or more validation locations, a zone for performing a validation, a validation type, and a round of validation, retrieving validation locations, each location associated with a status of not assigned, assigned, problem zone, or validated, and determining which of the retrieved validation locations needing assignment have a location in the received zone, a match in the validation type, and a match round of validation. Based on the determination, the method further comprises selecting one or more of the matching validation locations if a status of each determined validation locations is equal to not assigned and responding to the received request by transmitting one or more selected validation locations to the mobile device.

20 Claims, 12 Drawing Sheets

(56) References Cited

U.S. PATENT DOCUMENTS

| | | | |
|---|---|---|---|
| 9,132,957 B1 | 9/2015 | Girdhar | |
| 2006/0143030 A1 | 6/2006 | Wertheimer | |
| 2007/0156536 A1 | 7/2007 | Alfandary | |
| 2007/0203811 A1 | 8/2007 | Hoopes | |
| 2007/0295808 A1 | 12/2007 | Tamarkin et al. | |
| 2009/0210325 A1 | 8/2009 | Borom | |
| 2010/0312605 A1 | 12/2010 | Mitchell et al. | |
| 2014/0003727 A1* | 1/2014 | Lortz | G06F 16/583 382/218 |
| 2014/0279291 A1* | 9/2014 | Brosnan | G06Q 10/087 705/28 |
| 2017/0124511 A1* | 5/2017 | Mueller | G06Q 30/0635 |
| 2019/0188641 A1 | 6/2019 | Hibiki | |

FOREIGN PATENT DOCUMENTS

| | | |
|---|---|---|
| JP | 2016-060578 A | 4/2016 |
| TW | 2018-20235 A | 6/2018 |
| TW | M578849 U | 6/2019 |

OTHER PUBLICATIONS

PCT International Search Report for Application No. PCT/162020/056166, dated Oct. 7, 2020, (3 pages).

PCT Written Opinion of the International Searching Authority for Application No. PCT/162020/056166, dated Oct. 7, 2020, (6 pages).

Office Action issued by Taiwan Intellectual Property Office for Application No. 109122479, dated Nov. 9, 2020, (8 pages).

Search Report issued by Taiwan Intellectual Property Office for Application No. 109122479, dated Nov. 9, 2020, (2 page).

Taiwan Intellectual Property Office, Office Action and Search Report in counterpart Application No. 109122479 dated Mar. 19, 2021, with translation (7 pages).

Examination Report No. 2 in counterpart Australian Application No. 2020264402 dated Jul. 23, 2021 (7 pages).

Examination Notice in counterpart Hong Kong Application No. 22020010250.1 dated Jul. 15, 2021 (9 pages).

Office Action in counterpart Japan Application No. 2020-566763 dated Sep. 21, 2021 (17 pages).

* cited by examiner

FIG. 1C

COMPUTER-IMPLEMENTED SYSTEMS AND METHODS FOR VALIDATING A QUANTITY OF ITEMS IN FULFILLMENT CENTERS FOR INVENTORY MANAGEMENT

CROSS-REFERENCE TO RELATED APPLICATIONS

This application is a continuation of and claims the benefit of priority to U.S. application Ser. No. 16/505,889, filed Jul. 9, 2019 (now allowed), the contents of which are hereby incorporated herein by reference.

TECHNICAL FIELD

The present disclosure generally relates to computerized systems and methods for inventory management in fulfillment centers. In particular, embodiments of the present disclosure relate to inventive and unconventional systems relate to computer-implemented systems, methods, and user interfaces for efficiently validating a physical quantity of items in a location of a fulfillment center.

BACKGROUND

Fulfillment centers (FCs) encounter more than millions of products daily as they operate to fulfill consumer orders as soon as the orders are placed and enable shipping carriers to pick up shipments. Operations for managing inventory inside FCs may include receiving merchandise from sellers, stowing the received merchandise for easy picking access, packing the items, verifying the order, and package delivery. Although currently existing FCs and systems for inventory management in FCs are configured to handle large volumes of incoming and outgoing merchandise, a common issue arises when a FC receives more than can be fulfilled orders because of flawed validation on a quantity of items inside the FCs. For example, a merchant associated with an FC may display an item as available on its website, but the item is unavailable in the FC because workers in the FC miscounted a quantity of the item. This leads to lost sales and poor customer satisfaction, and a review from the dissatisfied customer may discourage potential sales from other buyers. The flawed validation on a quantity of items inside the FCs may also result a loss in sales of the item when the merchant's website displays an item as unavailable, but the FCs indeed retain the items. Moreover, the flawed quantity may hold up an efficient forecasting on a level of demand for a particular product.

To mitigate such problems, conventional inventory management systems assigned a team of workers to validate a quantity of items inside FC. Different workers would be assigned to enter a location inside the FC to validate a quantity of items and record the quantities. While these systems attempt to validate items in an efficient manner, many times workers receive undesirable locations they cannot validate conveniently. Moreover, current electronic systems are inflexible in terms of validating a quantity of items efficiently. A fixed number of workers validate a quantity of items inside the FC which may result an inefficient use of resources. For example, if first two physical quantities of items, counted by two different workers in a location inside a FC match, then it is a waste of resources when other workers validate the same location. The resources may be better utilized, for example, by enabling the other workers to validate other locations inside the FC.

Therefore, there is a need for improved methods and systems for assigning validation locations and validating a quantity of items in a fulfillment center.

SUMMARY

One aspect of the present disclosure is directed to a method for managing inventory by validating physical quantities of items in fulfillment centers for use with a user interface. The method may comprise operations. The operations comprise receiving from a mobile device, a request for one or more validation locations, a zone for performing a validation, a validation type, and a round of validation, retrieving validation locations, each location associated with a status of not assigned, assigned, problem zone, or validated, and determining which of the retrieved validation locations needing assignment have a location in the received zone, a match in the validation type, and a match round of validation. Based on the determination, the operation may further comprise selecting one or more of the matching validation locations if a status of each determined validation locations is equal to not assigned and responding to the received request by transmitting one or more selected validation locations to the mobile device.

Another aspect of the present disclosure is directed to a computer-implemented system for managing inventory by validating physical quantities of items in fulfillment centers for use with a user interface. The computer implemented system may include one or more memory devices storing instructions. The computer-implemented system may also include one or more processors configured to execute the instructions to perform operations as discussed above.

Yet another aspect of the present disclosure is directed to a system comprising the computer-implemented system as discussed above, and a mobile device. Consistent with disclosed embodiments, the mobile device may include a network interface, one or more memory devices storing instructions, and one or more processors configured to execute the instructions to perform operations. The operations may include transmitting. to the computer-implemented system, a request for one or more validation locations, a zone for performing a validation, a validation type, and a round of validation and receiving, from the computer-implemented system, one or more validation locations. The computer implemented system may include one or more memory devices storing instructions. The computer-implemented system may also include one or more processors configured to execute the instructions to perform operations as discussed above.

Other systems, methods, and computer-readable media are also discussed herein.

BRIEF DESCRIPTION OF THE DRAWINGS

Figure 1C:
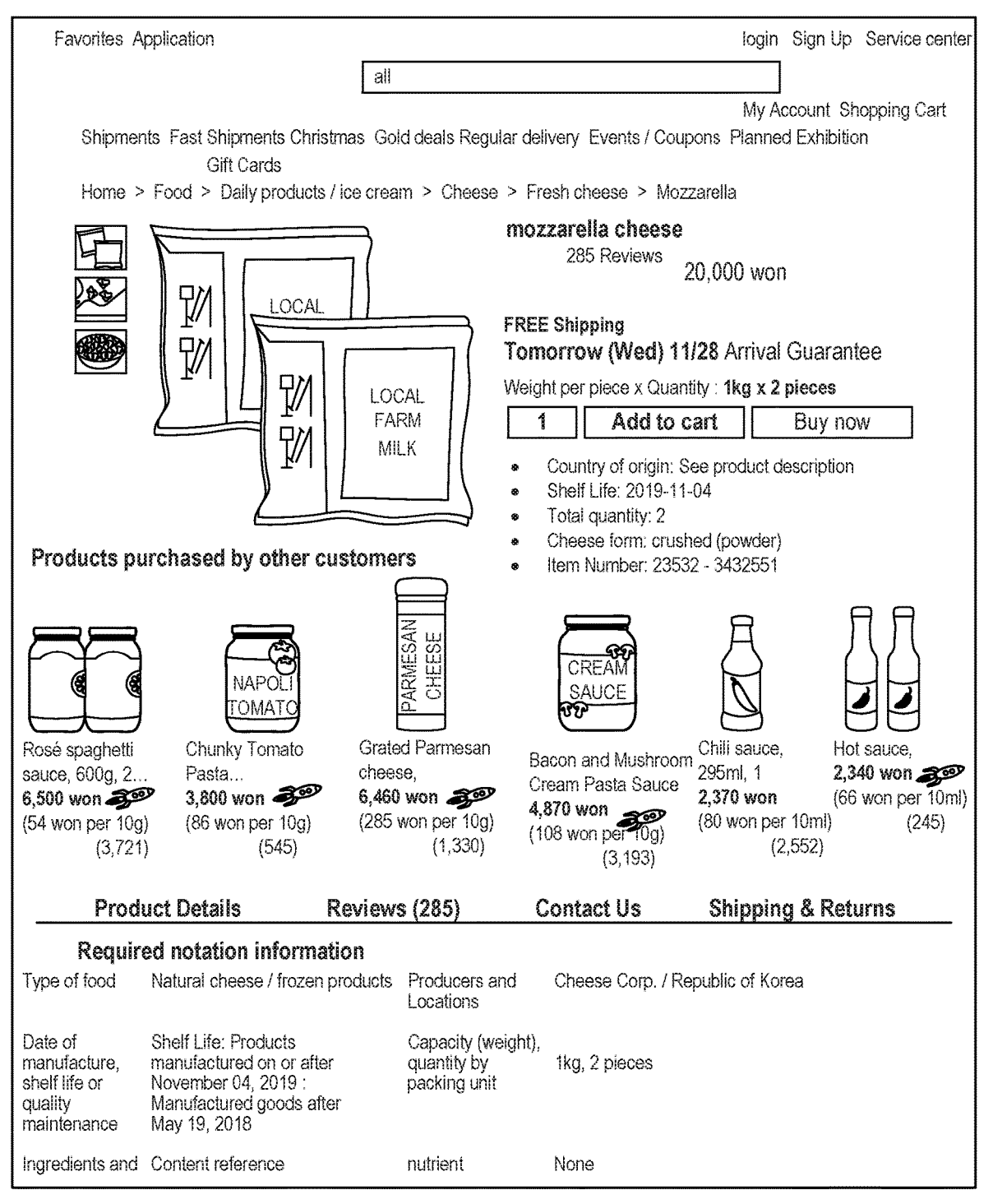

FIG. 1C depicts a sample Single Display Page (SDP) that includes a product and information about the product along with interactive user interface elements, consistent with the disclosed embodiments.

DETAILED DESCRIPTION

Figure 1A:
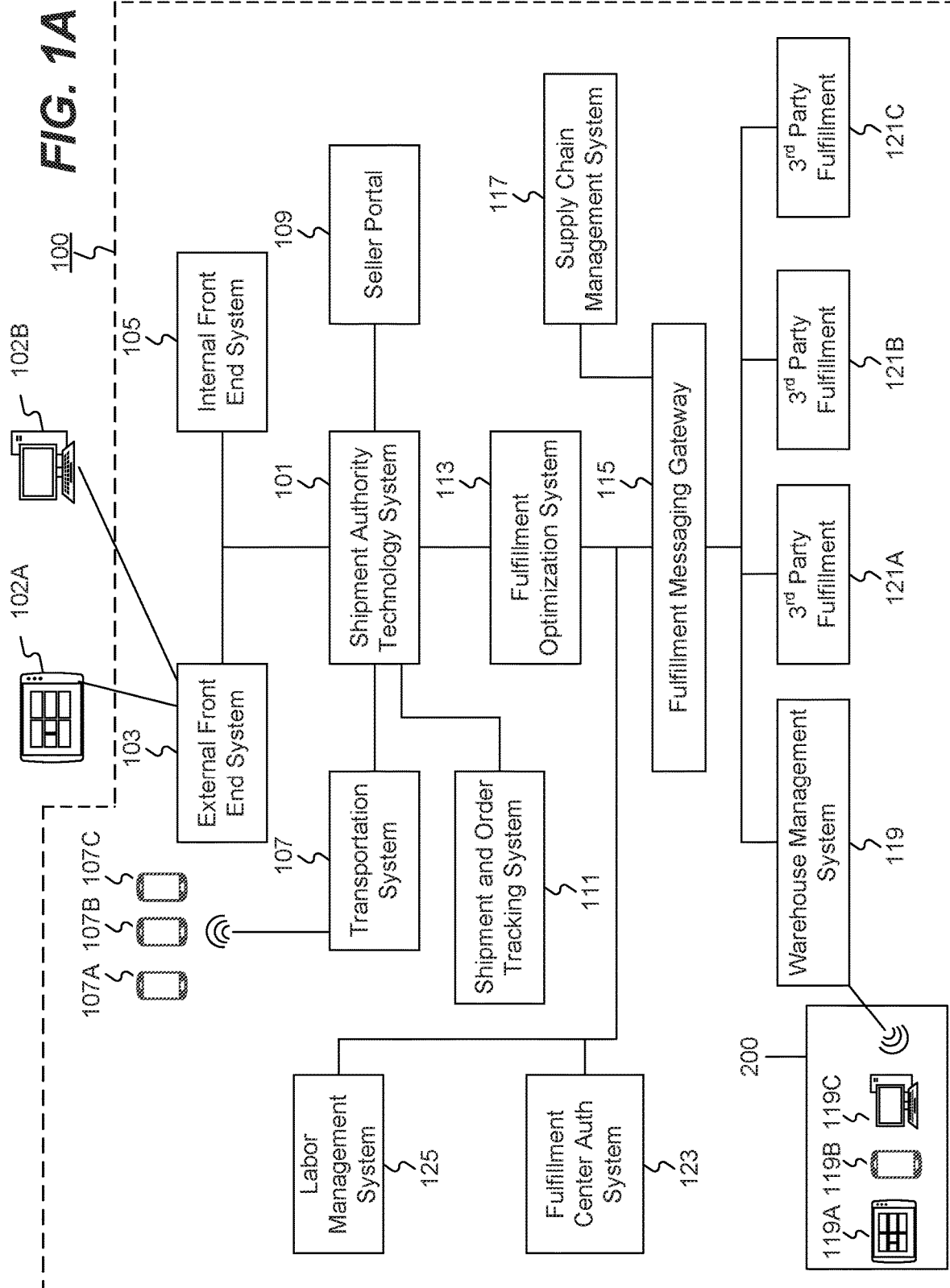
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods configured for managing inventories by validating physical quantities of inventories in fulfillment centers for use with a user interface. The disclosed embodiments provide innovative technical features that allow for automated validation location assignment based on a validation location request received in real-time. For example, the disclosed embodiments enable transmission of validation locations to mobile devices in real-time upon request, enable delivery workers to request particular types of validation and location for validation, and enable workers to conveniently select locations for associated validation tasks. Moreover, the disclosed embodiments provide innovative technical features that allow for automated validation process based on a validation results computed by comparing a received physical quantity of items in fulfillment center against a virtual quantity of items or any of previous physical quantities. For example, the disclosed embodiments enable determination of a location needing another round of validation and enable adjustment of a virtual quantity of items that helps determination on availability of items in sales.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3 PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3 PL systems 121A-121C may be configured to receive orders from FO system 113 (e.g., through FMG 115) and may provide products and/or services (e.g., delivery or installation) to customers directly. In some embodiments, one or more of 3 PL systems 121A-121C may be part of system 100, while in other embodiments, one or more of 3 PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
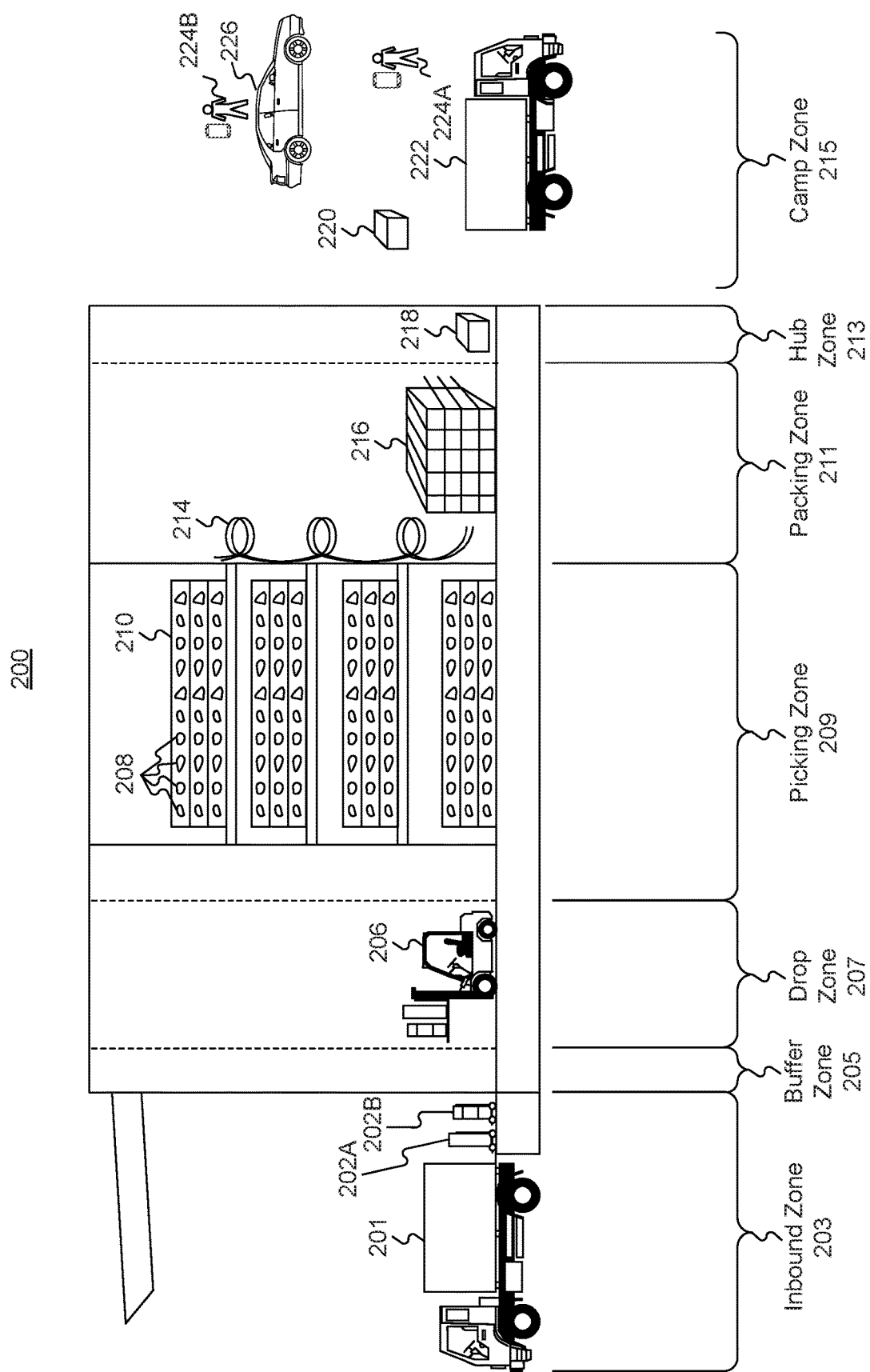
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, computer-implemented system for managing inventory may comprise one or more memory devices storing instructions, and one or more processors configured to execute the instructions to perform operations. In some embodiments, the disclosed functionality and systems may be implemented as part of one or more of FOS system 113 or WMS 119. The preferred embodiment comprises implementing the disclosed functionality and systems on fulfillment optimization system 113, but one of ordinary skill will understand that other implementations are possible.

Fulfillment optimization system 113 may store validation locations in several ways. First, fulfillment optimization system 113 may transmit a request, to a worker associated with mobile device 119B, to perform a Simple Bin Count (SBC) which requires the worker to go to a specific location, scan a location identifier, and acquire a physical quantity of items in the location within fulfillment center 200. When the acquired physical quantity of items does not match a virtual quantity of items, fulfillment system 113 may store the location as a validation location, with a tag indicating a defect was found while performing the SBC. Fulfillment optimization system 113 is described above as a system storing information describing where particular items are held or stored as well as associated information (e.g., quantity, size, date of receipt, expiration date, etc.) that includes a virtual quantity of items. Fulfillment optimization system 113 may transmit a request, to a worker associated with mobile device 119B, to perform Simple Record Count (SRC) which requires the worker to acquire a physical quantity of a single item in all locations within fulfillment center 200. When the acquired physical quantity of the item does not match a virtual quantity of the item, fulfillment system 113 may store the locations as validation locations, with a tag indicating a defect was found while performing the SRC. Fulfillment optimization system 113 may automatically store, at least once a year, records indicating all locations within fulfillment center 200 as locations needing validation, with a tag indicating IRDR (Inventory Record Defect Rate). Fulfillment optimization system 113 may store locations needing validation, with a tag indicating Last Unit, when a virtual quantity of single item drops below a pre-defined quantity. Fulfillment optimization system 113 may configure the pre-defined quantity to adjust a rate of storing validation locations. All validation locations may be initially stored with a status of "not assigned".

While embodiments of the present disclosure relate to scanning a one-dimensional barcode in order to capture a location identifier and/or an item identifier, one of ordinary skill will understand that other data capture implementations (e.g., using QR code, RFID tags, NFC communication, etc.) are possible.

Figure 3:
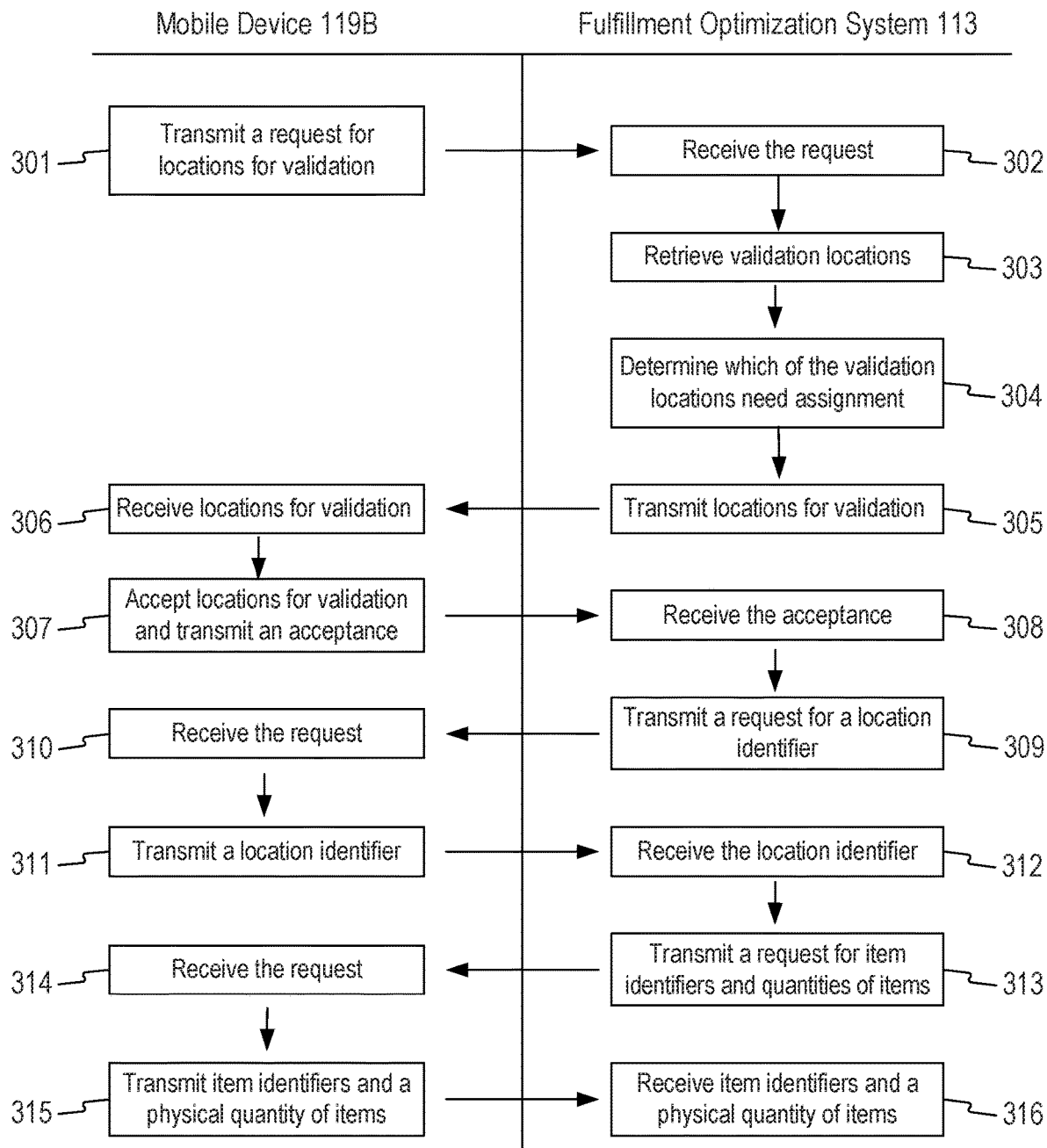
FIG. 3 is an exemplary flow chart of process for assigning a validation location from a fulfillment optimization system to a worker associated with mobile device in a fulfillment center, consistent with the disclosed embodiments.

FIG. 3 is an exemplary flow chart of process 300 for assigning a validation location from fulfillment optimization system 113 to a worker associated with mobile device 119B in fulfillment center 200. While FIG. 3 is described with respect to mobile device 119B and fulfillment optimization system 113, one of ordinary skill in the art will recognize that other configurations are possible.

Figure 4A:
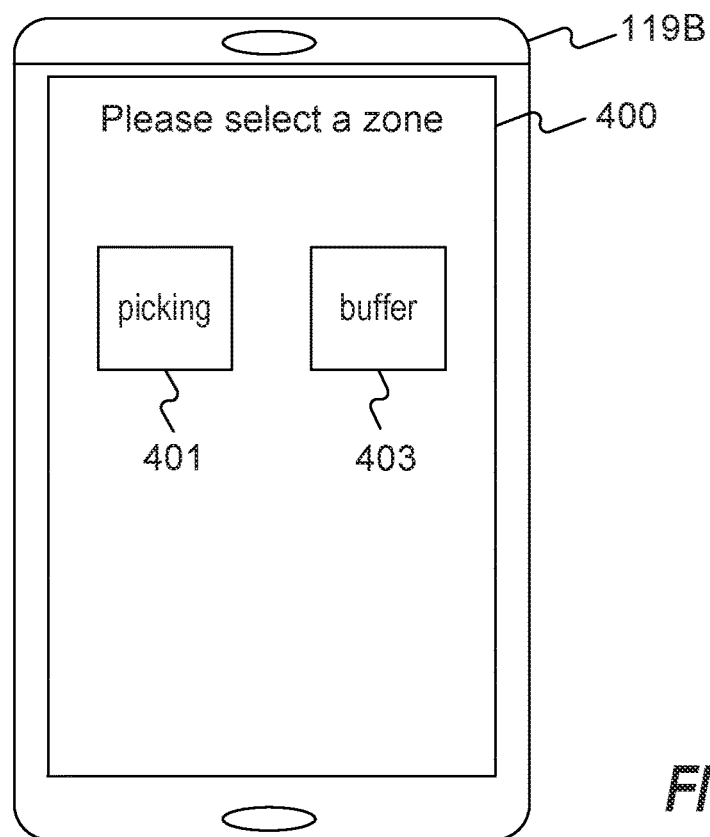
FIG. 4A depicts an exemplary user interface of a mobile device for selecting a zone for performing a validation task within a fulfillment center, consistent with the disclosed embodiments.
Figure 4B:
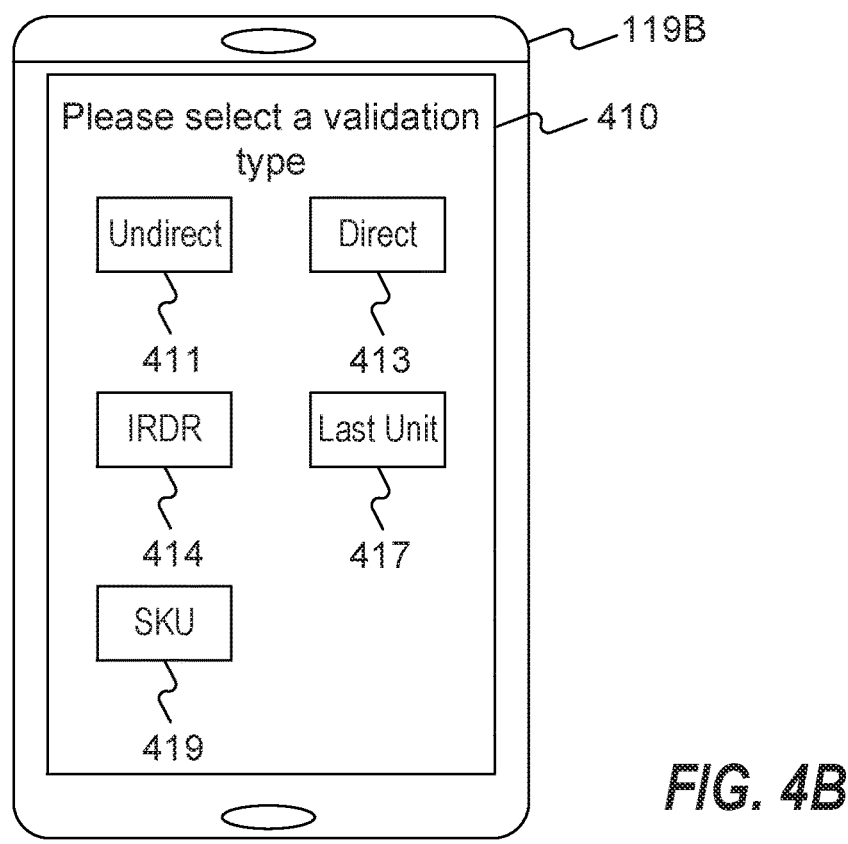
FIG. 4B depicts an exemplary user interface of a mobile device for selecting a validation type within a fulfillment center, consistent with the disclosed embodiments.
Figure 4C:
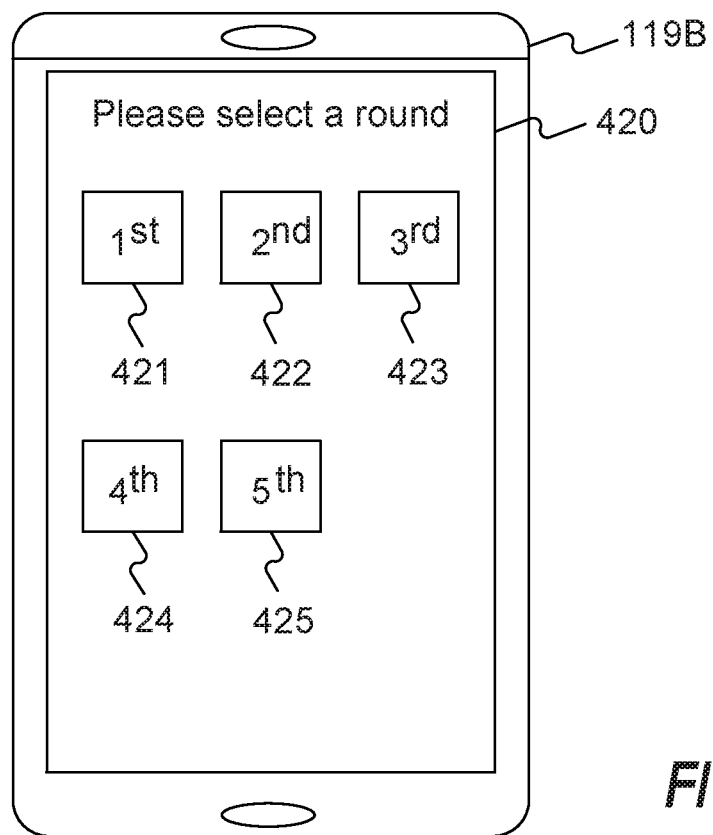
FIG. 4C depicts an exemplary user interface of a mobile device for selecting a round of validation within a fulfillment center, consistent with the disclosed embodiments.

In step 301, mobile device 119B may transmit a request for locations needing to fulfillment optimization system 113. The request may comprise, for example, a zone for performing a validation task, a validation type, and a round of validation received from a user interface of mobile device 119B to fulfillment optimization system 113. For example, a worker associated with mobile device 119B may press button representations in user interfaces of a mobile device 119B for selecting a zone for performing a validation task, a validation type, and a round of validation by using a pressure-sensitive input mechanism (e.g., a touch-screen device) or any other appropriate selection mechanism on a user interface in a mobile device 119B. Exemplary user interfaces for requesting validation locations along with a zone for performing a validation task, a validation type, and a round of validation are illustrated in FIGS. 4A-C and will be described in more detail.

In step 302, fulfillment optimization system 113 may receive the request for locations sent in step 301. The request may include, for example, a requested zone for performing a validation task, a requested validation type, and a requested round of validation from the worker.

In step 303, fulfillment optimization system 113 may retrieve validation locations associated with a status of "not assigned" as discussed above with respect to several ways of storing validation locations. In some embodiments, validation locations may be selected if the location is "not assigned" (e.g., if no workers are assigned to fulfill that validation) and may not be selected if the location is "assigned" (e.g., a worker is assigned to fulfill that validation), "problem zone" (e.g., defects were found when a worker validated a quantity of items in the location), or "validated" (e.g., if a worker was assigned to validate a quantity of items in the location and found no defects). As used herein, a validation location with assigned/problem zone/validated status may not be assigned to any workers while a validation location with not assigned may be assigned to workers.

Figure 5:
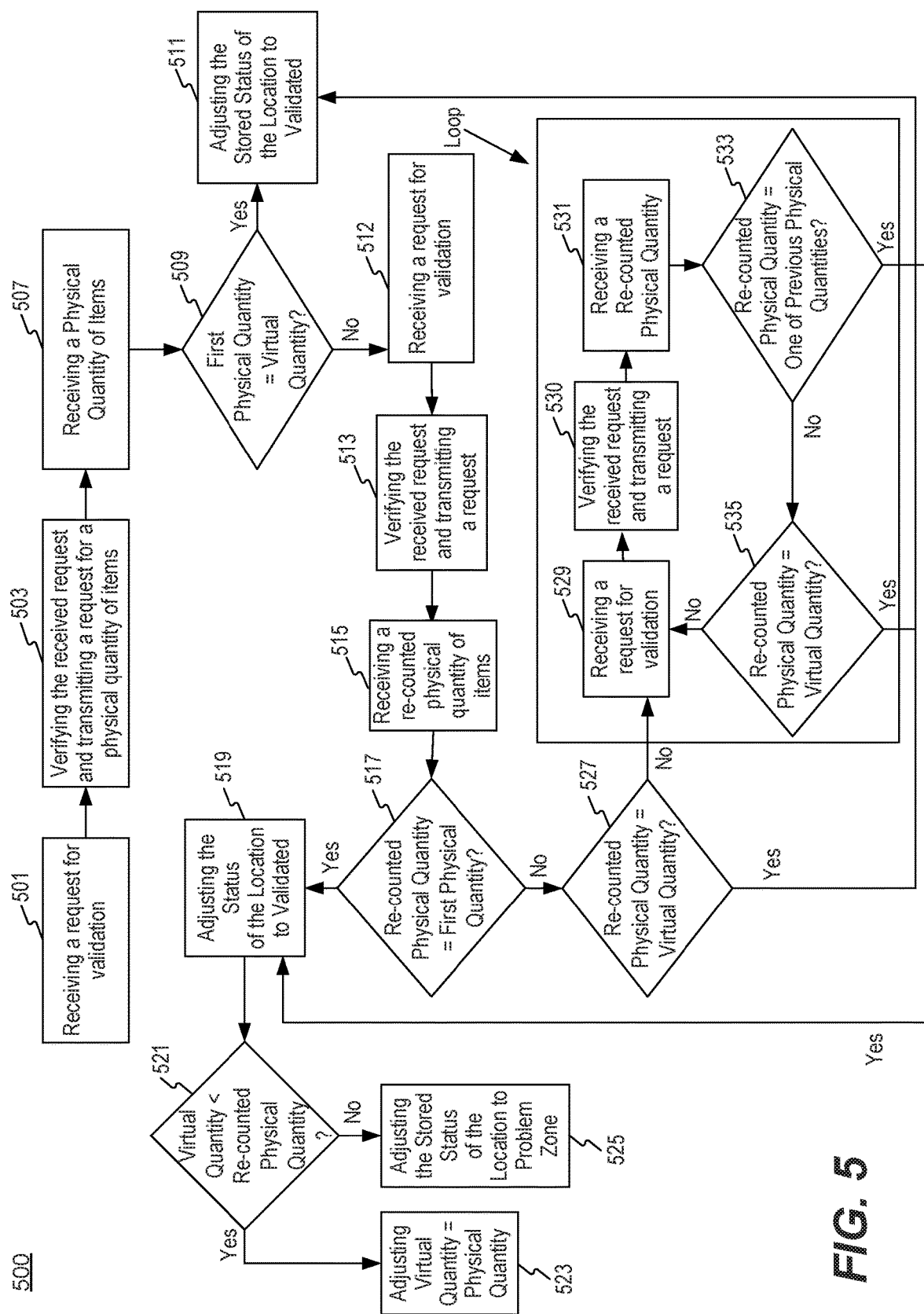
FIG. 5 is an exemplary flow chart of process for validating a physical quantity of items in a location within a fulfillment center, consistent with the disclosed embodiments.

In step 304, fulfillment optimization system 113 may determine validation locations for the received request. Fulfillment optimization system 113 may determine validation locations by selecting locations within the received zone and filtering the selected locations within the received validation type and the received a round of validation. In fulfillment center 200, a zone includes plurality of locations. Fulfillment optimization system 113 may select locations that are placed within the received zone. Filtering the selected location within the received validation type may include matching the received validation type against tags that are stored when validation locations are first stored as discussed above. When the received validation type is "undirect" or "direct", only selected locations with tags indicating a defect was found while performing the SBC may be selected by fulfillment optimization system 113. When the received validation type is "IRDR", only selected locations with tags indicating IRDR may be selected by fulfillment optimization system 113. When the received validation type is "Last Unit", only selected locations with tags indicating Last Unit may be selected by fulfillment optimization system 113. When the received validation type is "SKU", only selected locations with tags indicating a defect was found while performing the SRC may be selected by fulfillment optimization system 113. Filtering the selected location within the received round of validation type may include matching the received round of validation against stored round of validation associated with the selected locations. The stored round of validation may be updated by fulfillment optimization system 113 when a worker performs a validation in the location. For example, when a received round of validation is a third round of validation for a location, the location must have been visited twice by workers to get selected for a third round of validation. Process of updating a round of validation is illustrated in FIG. 5 and will be described in more detail.

Figure 4D:
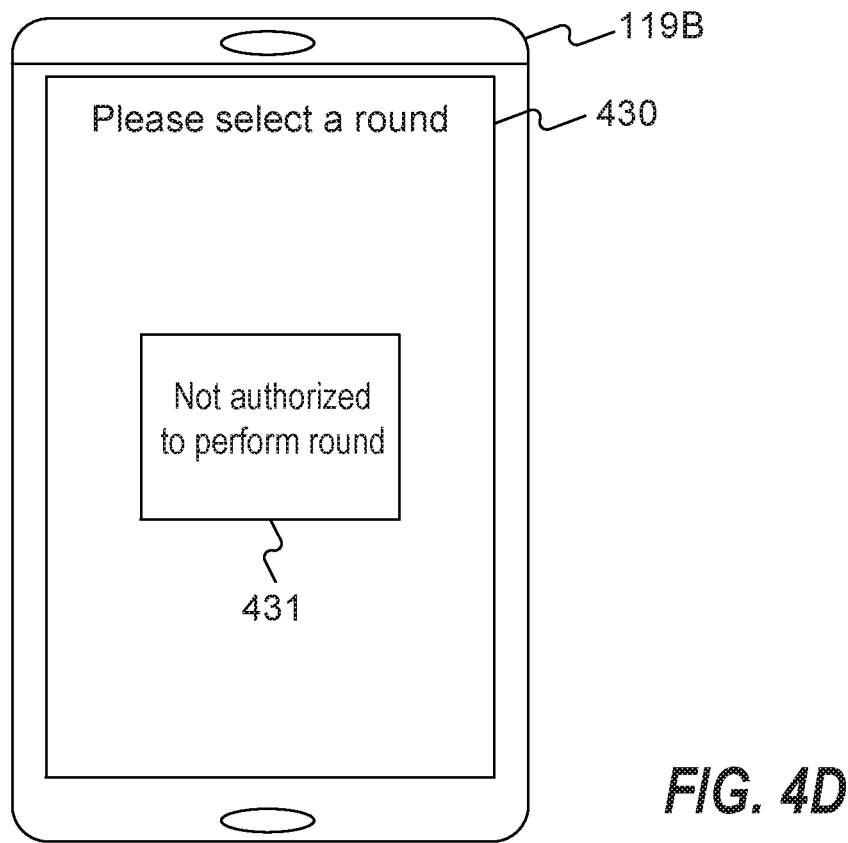
FIG. 4D depicts an exemplary user interface of a mobile device for notifying a worker associated with the mobile device that the worker does not have an authorization to validate a last round, consistent with the disclosed embodiments.

In step 305, fulfillment optimization system 113 may transmit the one or more determined validation locations from step 304 to the mobile device 1198 of the worker. For example, fulfillment optimization system 113 may transmit a user interface providing determined validation locations from step 304 to a mobile device 1198 of a worker. In another example, a fulfillment optimization system 113 may transmit a user interface to a mobile device 119B of a worker (e.g., not a manager of fulfillment center 200) indicating he/she does not have an authorization to perform a validation on a last round because only a manager of fulfillment center 200 may perform validation on a last round. An exemplary user interface for displaying an indication that a worker associated with mobile device 1198 does not have an authorization to perform a validation on a last round is illustrated in FIG. 4D and will be described in more detail.

In step 306, mobile device 1198 may receive the one or more transmitted validation locations from the fulfillment optimization system 113. For example, the mobile device 1198 may present a user interface of the transmitted validation locations in the form of buttons. An exemplary interface is discussed below with respect to FIG. 4E.

In step 307, mobile device 119B of the worker may accept the received validation location from step 306 and transmit acceptance of the validation location by a user input on a user interface in the mobile device 1198 to the fulfillment optimization system 113. For example, a user interface in the mobile device 1198 may present validation locations in the form of buttons and the mobile device 1198 may transmit acceptance of the validation location by capturing input and transmitting the corresponding selected validation location to fulfillment optimization system 113.

In step 308, fulfillment optimization system 113 may receive the acceptance of the validation location from mobile device 1198. For example, fulfillment optimization system 113 may receive an acceptance from a mobile application running on mobile device 1198.

In step 309, fulfillment optimization system 113 may transmit a request for a location identifier to the mobile device 1198. The location identifier may represent a location within fulfillment center 200. The location identifier may also comprise a list of items in location corresponding to the location identifier. For example, fulfillment optimization system 113 may transmit, to at least one mobile device/PDA 1198, a user interface requesting a location identifier which may be acquired by scanning (by mobile device/PDA 1198) a bar code placed in the determined location from step 304.

In step 310, mobile device 1198 may receive the request for a location identifier from the fulfillment optimization system 113. For example, the mobile device 1198 may present a user interface of the transmitted request. An example interface is discussed below with respect to FIG. 4F.

In step 311, mobile device 1198 may transmit a location identifier to the fulfillment optimization system 113. Mobile device 1198 may transmit a location identifier by scanning a barcode placed in a location or manually typing a location identifier written in a location.

In step 312, fulfillment optimization system 113 may receive, from the mobile device 1198, a requested location identifier from step 309. For example, when a worker associated with mobile device 1198 scans a barcode representing the location identifier, the mobile device 1198 may transmit the location identifier to fulfillment optimization system 113 automatically. Fulfillment optimization system 113 may determine whether the received location identifier from matches the determined validation location from step 304. The match may indicate that a worker associated with mobile device 1198 is performing a validation in the right location because it may be waste of resources if the worker performs validation in an unnecessary location. If the received location identifier does not match the determined location, the fulfillment optimization system 113 may transmit a message, to mobile device/PDA 1198, indicating the received location does not match with the location needing validation so the validation may not be performed in this location. If the received location identifier matches the determined location, the fulfillment optimization system 113, in step 313, may transmit, to mobile device/PDA 1198, a request for one or more item identifiers and physical quantities of items.

In step 314, mobile device 1198 may receive the request for one or more identifiers and physical quantities of items from the fulfillment optimization system 113. For example, the mobile device 1198 may present a user interface of the transmitted request. An example interface is discussed below with respect to FIG. 4G.

In step 315, mobile device 1198 may transmit one or more identifiers and a physical quantity of items to the fulfillment optimization system 113. The identifiers may be acquired by scanning (by mobile device 1198) barcodes disposed on items. When the bar code is scanned, a user interface similar to user interface 470 in FIG. 4H, which includes an item information similar to 473A, buttons 474A, and an indicator presenting zero, may be displayed on mobile device 1198. The mobile device 119 may transmit the item identifiers and the physical quantity of items by using a pressure-sensitive input mechanism (e.g., a touch-screen device) or any other appropriate selection mechanism on a user interface in a mobile device 1198. An example interface is discussed below with respect to FIG. 4H and will be described in more detail.

In step 316 fulfillment optimization system 113 may receive the item identifiers and the physical quantity of items from the mobile device 1198. When fulfillment optimization system 113 receives the item identifiers, the fulfillment optimization system 113 may determine whether the received item identifiers from matches the list of items from the received location identifier from step 312. A match may indicate that the items scanned by a worker associated with mobile device 1198 are in right location as suggested by the received location identifier which comprises a list of items in the location as discussed above with respect to step 309. If the received item identifier does not match the list of items from the location identifier, the fulfillment optimization system 113 may transmit a message, to mobile device 1196, indicating the item corresponding to one of the received item identifiers is in the wrong location.

FIG. 4A depicts an exemplary user interface 400 of a mobile device 1198 for selecting a zone for performing a validation task within a fulfillment center 200. The user interface 400 may include buttons 401 and 402 for selecting a zone for performing a validation task. For example, user interface 400 may receive a press on button 401 to select picking zone 209 for performing a validation in the picking zone. In another example, user interface 400 may receive a press on button 402 to select buffer zone 205 for performing a validation in the buffer zone 205. In some embodiments, after receiving a press on button 401 or 402, the next interface shown on mobile device 1198 may include another interface, such as the interface depicted in FIG. 4B.

FIG. 4B depicts an exemplary user interface 410 of a mobile device 119B for selecting a validation type within a fulfillment center 200. The user interface 410 may include a button 411 for undirect, a button 413 for direct, a button 415 for IRDR, a button 417 for Last Unit, and a button 419 for SKU for selecting a validation type.

Buttons 411/412 for undirect and direct may represent a validation task is performed in validation locations associated with SBC tags as discussed above with respect to step 304 in FIG. 3. For example, user interface 410 may receive a press on button 411 to select undirect validation for performing a validation in a location with a SBC tag. In another example, user interface 400 may receive a press on button 412 to select direct validation for performing a validation in a location with a SBC tag.

Button 415 for IRDR may represent a validation task is performed in validation locations with IRDR tags as discussed above with respect to step 304 in FIG. 3. For example, user interface 410 may receive a press on button 415 to select IRDR validation for performing a validation in a location with a IRDR tag.

Button 417 for Last Unit may represent a validation task is performed in validation locations with Last Unit tags as discussed above with respect to step 304 in FIG. 3. For example, user interface 410 may receive a press on button 417 to select Last Unit validation for performing a validation in a location with a Last Unit tag.

Button 419 for SKU may represent a validation task is performed in validation locations with SKU tags as discussed above with respect to step 304 in FIG. 3. For example, user interface 410 may receive a press on button 417 to select SKU validation for performing a validation in a location with a SKU tag.

In some embodiments, after receiving a press on one of buttons 411, 413, 415, 417 or 419, the next interface shown on mobile device 119B may include another interface, such as the interface depicted in FIG. 4C.

FIG. 4C depicts an exemplary user interface 420 of a mobile device 119B for selecting a round of validation. The user interface 420 may include a button 421 for first round, a button 422 for second round, a button 423 for third round, a button 424 for fourth round, and a button 425 for fifth round for selecting a round of validation. For example, user interface 420 may receive a press on button 423 to select a third round of validation for performing a validation in a location where two validations were already performed as discussed above with respect to step 304 in FIG. 3. In some embodiments, after receiving a press on buttons 421, 422, 423, 424, or 425, the next interface shown on mobile device 119B may include another interface, such as the interface depicted in FIG. 4E. In the exemplary user interface 420, the fifth round is presented as a last round for validation but one of ordinary skill will understand that other implementations are possible.

FIG. 4D depicts an exemplary user interface 430 of a mobile device 1198 for notifying a worker associated with the mobile device 1198 that the worker does not have the necessary authorization to validate a particular round. The user interface 423 may include a message 431 indicating that a worker does not have an authorization to validate a last round of validation. A manager of fulfillment center 200 may have an authorization to validate a last round (e.g., a fifth round) while other workers may not have such authorization. For example, if a worker, who is not a manger of fulfillment center 200, presses button 425, then message 431 may be displayed on mobile device 119B.

Selections made in FIGS. 4A-C may be transmitted to fulfillment optimization system 113 in step 301 and may be used in step 304 to determine validation locations as discussed above with respect to FIG. 3.

Figure 4E:
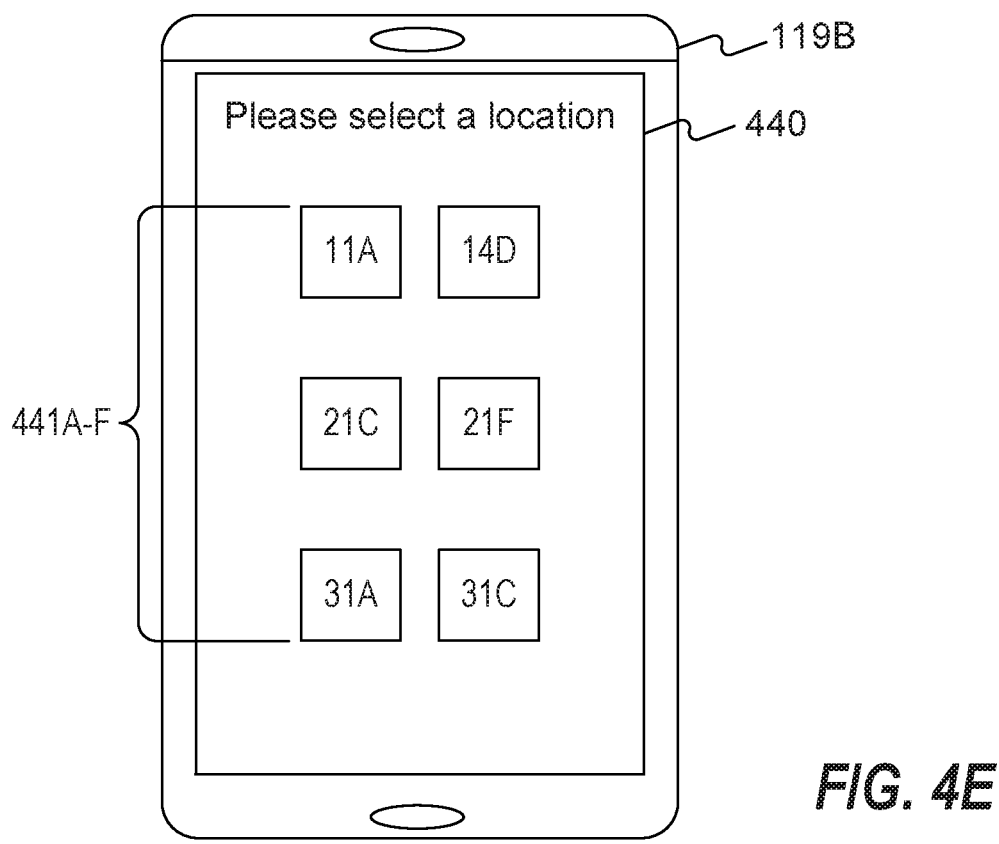
FIG. 4E depicts an exemplary user interface of a mobile device for selecting a validation location within a fulfillment center, consistent with the disclosed embodiments.

FIG. 4E depicts an exemplary user interface 440 of a mobile device 1198 for selecting a validation location within fulfillment center 200. The user interface 440 may include buttons 441A-F representing transmitted validation locations from step 305. For example, user interface 440 may receive a press on button 441A to select a location presented as "11A" in the user interface 440 for performing a validation. In some embodiments, after receiving a press on buttons 441A-F, mobile device 1198 may transmit a validation location to fulfillment optimization system 113 as discussed above with respect to step 307 in FIG. 3.

Figure 4F:
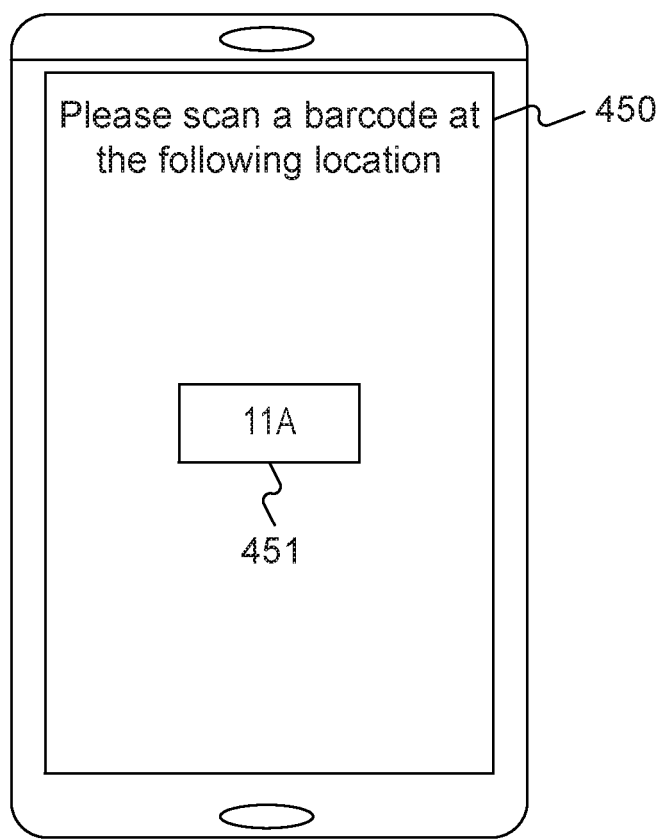
FIG. 4F depicts an exemplary user interface of a mobile device for requesting a location identifier to a worker associated with the mobile device, consistent with the disclosed embodiments.

FIG. 4F depicts an exemplary user interface 450 of a mobile device 119B for requesting a location identifier to a worker associated with the mobile device. The user interface 450 may include a message 451 requesting a location identifier representing a location selected by a worker of mobile device 119B in FIG. 4E. Mobile device 119B may transmit a location identifier in a multitude of ways, for example, based on scanning a barcode placed in a location or receiving a manually-typed location identifier, as discussed above with respect to step 311 in FIG. 3.

Figure 4G:
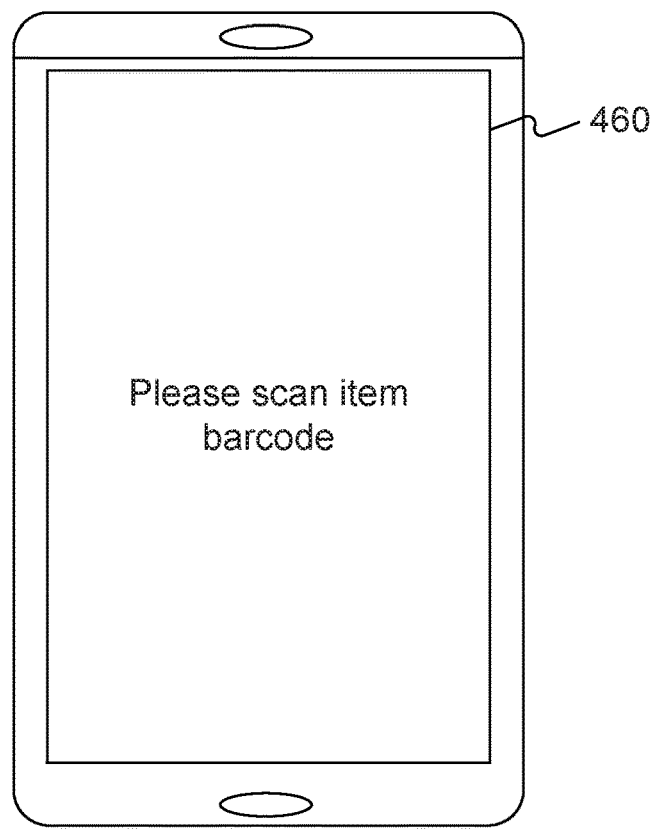
FIG. 4G depicts an exemplary user interface of a mobile device for requesting item identifiers to a worker associated with the mobile device, consistent with the disclosed embodiments.

FIG. 4G depicts an exemplary user interface 450 of a mobile device 119B for requesting item identifiers to a worker associated with the mobile device 119B. The user interface 460 may include a message requesting an item identifier by scanning a barcode placed on items (e.g., using a camera or image sensor on mobile device 119B) or by receiving a manually typed number (e.g., if the barcode is damaged, missing, or unreadable). In some embodiments, after a barcode is scanned, the next interface shown on mobile device 119B may include another interface, such as the interface depicted in FIG. 4H.

Figure 4H:
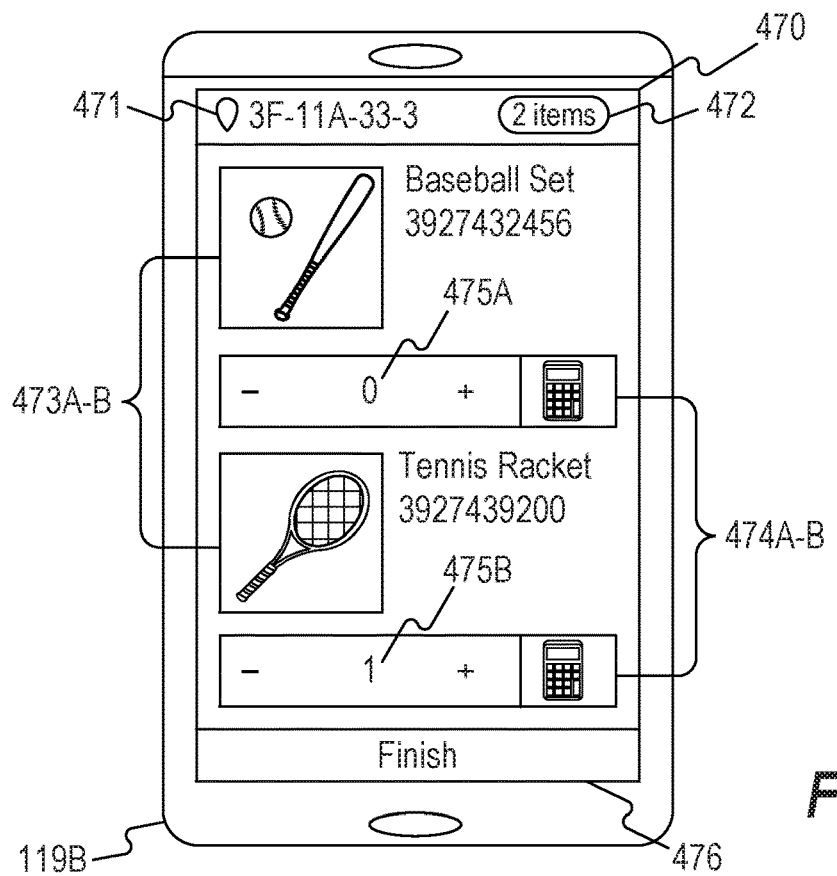
FIG. 4H depicts an exemplary user interface of a mobile device for counting a physical quantity of items in a location, consistent with the disclosed embodiments.

FIG. 4H depicts an exemplary user interface 470 of a mobile device 119B for counting a physical quantity of items in a location. The user interface 470 may include a location identifier 471, an indicator 472, one or more item information 473A-B, one or more buttons 474A-B, one or more indicators 475A-B, and a button 476.

Location identifier 471 may provide an indication of a current location where a validation is being performed. For example, a worker associated with a mobile device/PDA 119B may scan a location identifier in barcode to indicate where a validation for a physical quantity of items will be performed within fulfillment center 200. Fulfillment optimization system 113 may compare a location identifier with a determined location to verify whether a validation is performed in the right location (as discussed above with respect to FIG. 3).

Indicator 472 may provide how many items are currently being validated within location 471. One or more items may be validated at the same time. For example, indicator 472 may display a number for a worker associated with a mobile device 119B to perceive how many items are currently being validated. The exemplary user interface 470 depicts two items (baseball set and tennis racket) are being validated as indicated by indicator 472.

One or more item information 473A-B may include information relating to items to be validated, including an image of an item, a name of an item, and an item identifier which provides information associated with validating item (e.g., information such as manufacturer, description, material, size, color, packing, warranty terms, expiration date, etc.). Item information 473A or 473B may be generated when a user scans a new item (an item which has not been scanned before) with mobile device 119B. However, a physical quantity of item 475A or 475B may not be updated until the worker scans the new item again after the initial scan. For example, user interface 470 enables a user associated with a mobile device 119B to monitor a status of validation by updating item information 473A-B when a mobile device/PDA 119B scan an item.

One or more buttons 474A-B may adjust a quantity of item. The quantity of item may be adjusted manually by pressing a "+" or "−" symbol or it can be automatically adjusted when a mobile device/PDA 119B scans items. A result of the adjustment may be displayed by indicators 475A-B.

One or more indicators 475A-B may represent physical quantities of items adjusted by one or more buttons 474A-B as discussed above. The indicators 475A-B may also be adjusted automatically when mobile device/PDA 119B scans items 473A-B.

User interface 470 may receive a press on button 476 to transmit quantities of items in location 471 represented by one or more indicators 475A-B to fulfillment optimization system 113 as discussed above respect to step 315. As discussed above with respect to FIG. 1A, WMS 119 may store the received physical quantities of items and provide this information to fulfillment optimization system 113.

FIG. 5 is an exemplary flow chart of process 500 for validating a physical quantity of items in a specific location fulfillment center 200 multiple times if necessary, using mobile device 119B and fulfillment optimization system 113 to electronically validate physical quantities of items. While FIG. 5 is described with respect to mobile device 119B and fulfillment optimization system 113, one of ordinary skill in the art will recognize that other configurations are possible.

Fulfillment optimization system 113 may combine one or more steps of FIG. 3 and FIG. 5 to validate a physical quantity of items by assigning a validation location to a worker associated with mobile device 119B. Fulfillment optimization system 113 may utilize steps of process 500 to ensure that a validation in a specific location is performed sufficient times to prevent out of stock cancel when an item is available in system but not available in fulfillment center 200. To ensure the sufficient validation in the specific location, fulfillment optimization system 113 may utilize steps of process 300 to assign the location for validation to a worker. For example, step 308 and steps 501/512/529 may be interchangeable because fulfillment optimization system 113 may receive a request to perform validation in a specific location, which is depicted as receiving an acceptance of validation task in a specific location in step 309. Fulfillment system 113, for example, may perform steps 302-309 and 312 of FIG. 3 before performing step 503. Additional and/or alternative steps may also be added to process 300 and/or process 500.

In step 501, fulfillment optimization system 113 may receive a request for validating a specific location from a mobile device 1198 as discussed above with respect to step 308. In step 308, fulfillment optimization system 113 may receive acceptance of a validation location, the location which was determined in step 304.

In step 503, fulfillment optimization system 113 may verify whether a validation can be performed on the received location based on a status associated with the location. In some embodiments, a validation may be performed in a location in step 503 if the status associated with the location is "not assigned" (e.g., if no workers are assigned to fulfill that validation) and may not be selected if the status associated the location is "problem zone" (e.g., defects were found when a worker validated a quantity of items in the location), "validated" (e.g., if a worker was assigned to validate a quantity of items in the location and found no defects) or "assigned" (e.g., a worker is assigned to fulfill that validation). Fulfillment optimization system 113 may transmit a request for a physical quantity of items, as discussed above with respect to step 313, based on the verification to a mobile device 1198 and may adjust the status associated with the location to "assigned". For example, fulfillment optimization system 113 may transmit a request, to a mobile device 1198, for a physical quantity of items in a location when a status associated the location is "not assigned".

In step 507, fulfillment optimization system 113 may receive, from the mobile device 1198, a first physical quantity of items in the location. For example, fulfillment optimization system 113 may receive a first physical quantity of items from a mobile application running on mobile device 1198 (e.g., as depicted in FIGS. 4G and 4H).

In step 509, fulfillment optimization system 113 may determine whether the received first physical quantity of items matches a virtual quantity of items in the location. The virtual quantity of items may refer to associated information stored by fulfillment system 113 as fulfillment optimization system 113 is described above as a system storing information describing where particular items are held or stored as well as associated information (e.g., quantity, size, date of receipt, expiration date, etc.). For example, fulfillment optimization system 113 may store information describing where particular items are held or stored as well as associated information which provides expected quantity of items in the location. If the received first physical quantity of items matches the virtual quantity of items, the fulfillment optimization system 113, in step 511, may adjust the stored status associated with the location to "validated." If the received physical quantity of items does not match the virtual quantity of items, the fulfillment optimization system 113 may adjust the status associated with the location to "not assigned" and a round associated with the location by adding one to the round, and receive, in step 512, a request for validating the location from a mobile device 1198 as discussed above with respect to step 308 in FIG. 3.

In step 513, fulfillment optimization system 113 may verify whether a validation can be performed on the received location based on a status associated the location. In some embodiments, a validation may be performed in a location in step 513 if the status associated with the location is "not assigned" (e.g., if no workers are assigned to fulfill that validation) and may not be selected if the status associated with the location is "problem zone" (e.g., defects were found when a worker validated a quantity of items in the location), "validated" (e.g., if a worker was assigned to validate a quantity of items in the location and found no defects) or "assigned" (e.g., a worker is assigned to fulfill that validation). Fulfillment optimization system 113 may transmit a request for a physical quantity of items, as discussed above with respect to step 313, based on the verification to a mobile device 1198 and may adjust the status associated with the location to "assigned". For example, fulfillment optimization system 113 may transmit a request, to a mobile device 1198, for a physical quantity of items in a location when a status associated with the location is "not assigned".

In step 515, fulfillment optimization system 113 may receive, from the mobile device 1198, a re-counted physical quantity of items in the location. For example, fulfillment optimization system 113 may receive a re-counted physical quantity of items from a mobile application running on a mobile device 1198.

In step 517, fulfillment optimization system 113 may determine whether the received re-counted physical quantity of items matches the first physical quantity of items from step 507. If the received re-counted physical quantity of items matches the first physical quantity of items, the fulfillment optimization system 113, in step 519, may adjust the stored status associated with the location to "validated". If the received re-counted physical quantity of items does not match the first physical quantity of items, the fulfillment optimization system 113, in step 527, may determine whether the received re-counted physical quantity of items matches the virtual quantity of items.

In step 521, fulfillment optimization system 113 may determine whether the virtual quantity of items is fewer than the re-counted physical quantity of items. If the virtual quantity of items is fewer than the re-counted physical quantity of items, the fulfillment optimization system 113, in step 523, may adjust the stored virtual quantity of items to match the re-counted physical quantity of items. If the virtual quantity of items is not fewer than the re-counted physical quantity of items, the fulfillment optimization system 113, in step 525, may adjust the status associated with the location to "problem zone". In some embodiments, fulfillment optimization system 113 may prevent purchase order of the items from the location by communicating to SAT system 101 when the status associated with the location is "problem zone". Fulfillment optimization system 113 may further transmit a message to a worker associated with mobile device 1198 to remove all items in any location matched "problem zone" and take other actions to resolve issues related to a quantity of items.

In step 527, if the determination in step 517 was that the re-counted physical quantity of items did not match to the first physical quantity of items, fulfillment optimization system 113 may determine whether the received re-counted physical quantity of items matches the virtual quantity of items. If the received re-counted physical quantity of items matches the virtual quantity of items, fulfillment optimization system 113, in step 511, may adjust the status associated with the location to "validated". If the received re-counted physical quantity of items does not match the virtual quantity of items, fulfillment optimization system 113, in step 529, may adjust the status associated with the location to "not assigned" and a round associated with the location by adding one to the round, and receive, in step 529, a request for validating the location from a mobile device 1198 as discussed above with respect to step 308 in FIG. 3.

In step 530, fulfillment optimization system 113 may verify whether a validation can be performed on the received location based on a status associated with the location. In some embodiments, a validation may be performed in a location in step 530 if the status associated with the location is "not assigned" (e.g., if no workers are assigned to fulfill that validation) and may not be selected if the status associated with the location is "problem zone" (e.g., defects were found when a worker validated a quantity of items in the location), "validated" (e.g., if a worker was assigned to validate a quantity of items in the location and found no defects) or "assigned" (e.g., a worker is assigned to fulfill that validation). Fulfillment optimization system 113 may transmit, to a mobile device 1198, a request for a physical quantity of items, as discussed above with respect to step 313, based on the verification and may adjust the status associated with the location to "assigned". For example, fulfillment optimization system 113 may transmit a request, to a mobile device 1198, for a physical quantity of items in a location when a status associated with the location is "not assigned."

In step 531, fulfillment optimization system 113 may receive, from the mobile device 1198, a re-counted physical quantity of items in the location. For example, fulfillment optimization system 113 may receive a re-counted physical quantity of items from a mobile application running on a mobile device 1198.

In step 533, fulfillment optimization system 113 may determine whether the received re-counted physical quantity of items from step 531 matches a previously received physical quantity of items. The previous physical quantities of items may refer to physical quantities of items from step 507 and 515, as well as from previous operations of step 531. In some embodiments, the received re-counted physical quantity may be compared to other received physical quantities. In some embodiments, steps 529, 530, 531, 533, and 535 may be iterated until a re-counted physical quantity of items matches one of previous physical quantities of items or the virtual quantity. If the received re-counted physical quantity of items matches one of previous physical quantities of items, the fulfillment optimization system 113, in step 519, may adjust the status associated with the location to "validated" and take further steps as discussed above respect to steps 519 and 521. If the received re-counted physical quantity of items does not match one of previous physical quantities of items, the fulfillment optimization system 113, in step 535, may determine whether the received re-counted physical quantity of items matches the virtual quantity of items.

In step 535, as discussed above with respect to step 533, fulfillment optimization system 113 may determine whether the received re-counted physical quantity of items matches the virtual quantity of items. If the received re-counted physical quantity of items matches the virtual quantity of items, fulfillment optimization system 113, in step 511, may adjust the stored status associated with the location to "validated." If the received re-counted physical quantity of items does not match the virtual quantity of items, the fulfillment optimization system 113, may adjust the status associated with the location to "not assigned" and a round associated with the location by adding one to the round, and receive, in step 529, a request for validating the location from a mobile device 1198 as discussed above with respect to step 308.

In some embodiments, steps 529, 530, 531, 533 and 535 may be iterated until a re-counted physical quantity of items matches one of previous physical quantities of items from steps 507, 515, and 531 or the virtual quantity. In another embodiments, an iteration of step 529, 530, 531, 533, and 535 may be stopped if it has reached a pre-defined count. For example, fulfillment optimization system 113 may decide not to receive a request for validating the location from to a mobile device after a pre-defined count (e.g., after running the iteration five times) and use a re-counted physical quantity of items from the last iteration to compare against the virtual quantity of items in step 521 and take further steps as discussed above respect to step 521.

Fulfillment optimization system 113 may generate validation status reports and transmit the reports to computer 119C. The validation status reports may comprise one or more of a location identifier, an item identifier, a validation start time, a validation complete time, a number of rounds validation was performed, a status associated with location, a virtual quantity of items in location, a physical quantity of items in location, and a difference between the virtual quantity and the physical quantity. The reports may be in the form of spreadsheets. The reports may provide an indication to a manager of fulfillment center 200 to closely monitor a location marked as "problem zone".

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

One or more memory devices may store data and instructions used to perform one or more features of the disclosed embodiments. For example, memory may represent a tangible and non-transitory computer-readable medium having stored therein computer programs, sets of instructions, code, or data to be executed by processor. Memory may include, for example, a removable memory chip (e.g., EPROM, RAM, ROM, DRAM, EEPROM, flash memory devices, or other volatile or non-volatile memory devices) or other removable storage units that allow instructions and data to be accessed by processor.

One or more memory devices may also include instructions that, when executed by processor, perform operations consistent with the functionalities disclosed herein. Devices consistent with disclosed embodiments are not limited to separate programs or computers configured to perform dedicated tasks. For example, memory may include one or more programs to perform one or more functions of the disclosed embodiments.

One or more processors may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems. The disclosed embodiments are not limited to any type of processor(s).

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system, comprising:
one or more memory devices storing instructions;
one or more processors configured to execute the instructions to perform operations comprising:
    receiving, from a mobile device, a request for validation;
    determining one or more validation locations needing assignment;
    transmitting one or more validation locations to the mobile device;
    receiving, from the mobile device, acceptance of the transmitted validation location;
    transmitting, to the mobile device, based on the accepted validation location, a request for a location identifier comprising a list of items in the accepted validation locations;
    receiving, from the mobile device, the requested location identifier;
    determining whether the received location identifier matches the accepted validation location; and
    transmitting to the mobile device, a request for one or more item identifiers based on the determination.

2. The computer-implemented system of claim 1, wherein the operations further comprise:
receiving, from the mobile device, one or more requested item identifiers;
determining whether the received item identifiers match the list of items from the location identifier; and
transmitting, to the mobile device, a request for a first physical quantity of items in the accepted validation location.

3. The computer-implemented system of claim 1, wherein the operations further comprise:
transmitting a request for a first physical quantity of items in the accepted validation location to the mobile device;
receiving, from the mobile device, a first physical quantity of items;

determining whether the received first physical quantity of items matches a virtual quantity of items in the accepted validation location; and when the first physical quantity matches the virtual quantity:
  adjusting the status of the accepted validation location to validated; and when the first physical quantity does not match the virtual quantity:
  adjusting the status of the accepted validation location to not assigned and a round associated with the location.

4. The computer-implemented system of claim 3, wherein the operations further comprise:
  receiving, from a mobile device, a request for validation in the accepted validation location and a round of validation;
  determining whether the received round of validation matches the round associated with the accepted validation location;
  responding to the received request by transmitting a request for a re-counted physical quantity of items in the accepted validation location to the mobile device based on the determination; and
  adjusting the status of the accepted validation location to assigned.

5. The computer-implemented system of claim 4, wherein the operations further comprise:
  receiving, from the mobile device, a re-counted physical quantity of items;
  determining whether the received re-counted physical quantity of items matches the first physical quantity of items; and
  when the received re-counted physical quantity matches the first physical quantity:
    adjusting the status of the accepted validation location to validated, and
    adjusting the virtual quantity to match the re-counted physical quantity when the virtual quantity is fewer than the re-counted physical quantity; or
    adjusting the status of the accepted validation location to problem zone to prevent purchase order of the items in the determined location when the re-counted physical quantity is fewer than the virtual quantity; and
  when the received re-counted physical quantity does not match the first physical quantity:
    determining whether the received re-counted physical quantity of items matches the virtual quantity of items; and
    when the received re-counted physical quantity matches the virtual quantity of items:
      adjusting the status of the accepted validation location to validated; and
    when the received re-counted physical quantity does not match the virtual quantity of items:
      adjusting the status of the accepted validation location to not assigned and a round associated with the location.

6. The computer-implemented system of claim 5, wherein the operations further comprise accepting, from a mobile device, at least one request for validation in the accepted validation location and a round of validation until a received re-counted physical quantity matches one of previous physical quantities of items or the virtual quantity of items.

7. The computer-implemented system of claim 1, wherein the request for validation comprises a zone for performing a validation task, a validation type, and round of validation.

8. The computer-implemented system of claim 7, wherein determining one or more validation locations needing assignment comprises selecting locations within the zone and filtering the selected locations with a validation type and a round of validation.

9. The computer-implemented system of claim 1, wherein at least one of the location identifier or the one or more item identifiers are obtained by scanning a barcode with the mobile device.

10. A computer-implemented method for managing inventory by validating physical quantities of items in fulfillment centers for use with a user interface, comprising:
  receiving, from a mobile device, a request for validation;
  determining one or more validation locations needing assignment;
  transmitting one or more validation locations to the mobile device;
  receiving, from the mobile device, acceptance of the transmitted validation location;
  transmitting, to the mobile device for display, based on the accepted validation location, a request for a location identifier comprising a list of items in the accepted validation location;
  receiving, from the mobile device, the requested location identifier;
  determining whether the received location identifier matches the accepted validation location; and
  transmitting, to the mobile device, a request for one or more item identifiers based on the determination.

11. The method of claim 10, further comprising: receiving, from the mobile device, one or more requested item identifiers; determining whether the received item identifiers match the list of items from the location identifier; and transmitting, to the mobile device, a request for a first physical quantity of items in the accepted validation location.

12. The method of claim 10, further comprising:
  transmitting a request for a first physical quantity of items in the accepted validation location to the mobile device;
  receiving, from the mobile device, a first physical quantity of items;
  determining whether the received first physical quantity of items matches a virtual quantity of items in the accepted validation location; and
  when the first physical quantity matches the virtual quantity:
    adjusting the status of the accepted validation location to validated; and
  when the first physical quantity does not match the virtual quantity:
    adjusting the status of the accepted validation location to not assigned and a round associated with the location.

13. The method of claim 12, further comprising:
  receiving, from a mobile device, a request for validation in the accepted validation location and a round of validation;
  determining whether the received round of validation matches the round associated with the accepted validation location;
  responding to the received request by transmitting a request for a re-counted physical quantity of items in the accepted validation location to the mobile device based on the determination; and adjusting the status of the accepted validation location to assigned.

14. The method of claim 13, further comprising:
receiving, from the mobile device, a re-counted physical quantity of items;
determining whether the received re-counted physical quantity of items matches the first physical quantity of items; and
when the received re-counted physical quantity matches the first physical quantity:
adjusting the status of the accepted validation location to validated, and
adjusting the virtual quantity to match the re-counted physical quantity when the virtual quantity is fewer than the re-counted physical quantity; or
adjusting the status of the accepted validation location to problem zone to prevent purchase order of the items in the determined location when the re-counted physical quantity is fewer than the virtual quantity; and
when the received re-counted physical quantity does not match the first physical quantity:
determining whether the received re-counted physical quantity of items matches the virtual quantity of items; and
when the received re-counted physical quantity matches the virtual quantity of items:
adjusting the status of the accepted validation location to validated; and
when the received re-counted physical quantity does not match the virtual quantity of items:
adjusting the status of the accepted validation location to not assigned and a round associated with the location.

15. The method of claim 14, further comprising accepting, from a mobile device, at least one request for validation in the accepted validation location and a round of validation until a received re-counted physical quantity matches one of previous physical quantities of items or the virtual quantity of items.

16. The method of claim 15, wherein the at least one request for validation is not accepted upon reaching a predefined number of iterations.

17. The method of claim 10, wherein the request for validation comprises a zone for performing a validation task, a validation type, and round of validation, and wherein determining one or more validation locations needing assignment comprises selecting locations within the zone and filtering the selected locations with a validation type and a round of validation.

18. The method of claim 10, wherein at least one of the location identifier and the one or more item identifiers are obtained by scanning a barcode with the mobile device.

19. A system comprising:
a computer-implemented system for managing inventory by validating physical quantities of items in fulfillment centers for use with a user interface, comprising:
one or more memory devices storing instructions; and
one or more processors configured to execute the instructions to perform operations comprising:
receiving, from a mobile device, a request for validation;
determining one or more validation locations needing assignment;
transmitting one or more validation locations to the mobile device;
receiving, from the mobile device, acceptance of the transmitted validation location;
transmitting, to the mobile device, based on the accepted validation location, a request for a location identifier comprising a list of items in the accepted validation locations;
receiving, from the mobile device, the requested location identifier;
determining whether the received location identifier matches the accepted validation location; and
transmitting to the mobile device, a request for one or more item identifiers based on the determination.

20. The system of claim 19, wherein the instructions of the computer-implemented system further cause the processors of the computer-implemented system to perform operations comprising:
receiving, from the mobile device, a first physical quantity of items; and
determining whether the received first physical quantity of items matches a virtual quantity of items in the accepted validation location; and
when the first physical quantity matches the virtual quantity:
adjusting the status of the accepted validation location to validated; and
when the first physical quantity does not match the virtual quantity:
adjusting the status of the accepted validation location to not assigned and a round associated with the location.

* * * * *